US008764890B2

(12) United States Patent
Yi et al.

(10) Patent No.: US 8,764,890 B2
(45) Date of Patent: Jul. 1, 2014

(54) DRY CARBON DIOXIDE CAPTURING DEVICE USING MULTI SORBENTS

(71) Applicant: Korea Institute of Energy Research, Daejeon (KR)

(72) Inventors: Chang-Keun Yi, Daejeon (KR); Young Cheol Park, Daejeon (KR); Sung-Ho Jo, Daejeon (KR); Gyoung Tae Jin, Daejeon (KR); Dowan Shun, Daejeon (KR); Dal-Hee Bae, Daejeon (KR); Jaehyeon Park, Daejeon (KR); Ho-Jung Ryu, Daejeon (KR); Seung-Yong Lee, Daejeon (KR); Jong-Ho Moon, Seoul (KR); Dong-Ho Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 25 days.

(21) Appl. No.: 13/690,649

(22) Filed: Nov. 30, 2012

(65) Prior Publication Data

US 2013/0167725 A1    Jul. 4, 2013

(30) Foreign Application Priority Data

Dec. 12, 2011    (KR) .................. 10-2011-0133102

(51) Int. Cl.
*B01D 53/02* (2006.01)
(52) U.S. Cl.
USPC ............... 96/134; 96/122; 96/123; 96/150; 95/139; 422/144; 423/230

(58) Field of Classification Search
USPC ............... 96/122, 123, 134, 150; 95/139; 422/144; 423/230
See application file for complete search history.

(56) References Cited

U.S. PATENT DOCUMENTS

| 4,409,102 | A | * | 10/1983 | Tanner | 210/603 |
|---|---|---|---|---|---|
| 4,539,188 | A | * | 9/1985 | Hirsch et al. | 423/210 |
| 5,043,058 | A | * | 8/1991 | Forgac et al. | 208/48 Q |
| 5,304,234 | A | * | 4/1994 | Takatsuka et al. | 95/106 |
| 6,387,337 | B1 | * | 5/2002 | Pennline et al. | 423/220 |
| 2008/0145309 | A1 | * | 6/2008 | Bavarian et al. | 423/651 |
| 2010/0172810 | A1 | * | 7/2010 | Yi et al. | 422/292 |
| 2011/0139596 | A1 | * | 6/2011 | Bartek et al. | 201/2.5 |

* cited by examiner

*Primary Examiner* — Christopher P Jones
(74) *Attorney, Agent, or Firm* — Baker & Hostetler LLP

(57) ABSTRACT

Disclosed is a dry $CO_2$ capturing device using multi sorbents so as to maintain the sorption rate for exhaust gas containing $CO_2$. The dry carbon dioxide ($CO_2$) capturing device comprises at least two dry carbon dioxide ($CO_2$) capturing parts comprising: a first and second recovery reactors 104 and 105 to recover $CO_2$ by contacting a solid sorbent with exhaust gas; a first and second recovery cyclones 106 and 122 connected to the recovery reactors; a first and second regenerators 110 and 126 connected to the recovery cyclones; and a first and second pre-treatment reactors 116 and 132 connected to the regenerators through sorbent supply lines. The first and second carbon dioxide ($CO_2$) capturing parts are connected to each other so as to feed an isolated gas, which is separated with the solid sorbent in the first recovery cyclone 106 of the first dry $CO_2$ capturing part, to the second dry $CO_2$ capturing part through the exhaust gas supply line, and different solid sorbents are used in the first and second $CO_2$ capturing parts.

5 Claims, 3 Drawing Sheets

DRY CARBON DIOXIDE CAPTURING DEVICE USING MULTI SORBENTS

RELATED APPLICATIONS

This application claims priority to Korean Patent Application No. 10-2011-0133102, filed on Dec. 12, 2011 in the Korean Intellectual Property Office, the entire disclosure of which is incorporated herein by reference.

BACKGROUND OF THE INVENTION

1. Field of the Invention

The present invention relates to a dry carbon dioxide ($CO_2$) capturing device, and more specifically to a dry $CO_2$ capturing device using multi sorbents so as to maintain the sorption rate for exhaust gas containing $CO_2$ in which temperature rises by reacting with the sorbent containing $CO_2$ absorbed therein.

2. Description of the Related Art

A carbon dioxide capture apparatus in related art generally employs a wet process to recover $CO_2$. That is, the wet process is carried out by passing $CO_2$-containing gas through an amine solution, to allow $CO_2$ to be absorbed into the solution and regenerating the solution in a regeneration column, thus reusing the solution. However, the wet process has a demerit of further creating waste water during operation of the wet process.

In order to overcome disadvantages of the wet process in the art, a dry process for $CO_2$ recovery has been proposed. This method is to recover $CO_2$ by a dry processing system using two reactors, wherein $CO_2$ fed into a recovery reactor is adsorbed to a solid adsorbent (a dry adsorbent) and removed. The solid adsorbent inflows into a regeneration reactor ('regenerator') to remove the adsorbed $CO_2$, $H_2O$ is adsorbed to the solid adsorbent in a pre-treatment reactor, and then the adsorbent is recycled in a recovery reactor.

As shown in FIG. 3, the sorbent has an excellent sorption rate in a specific temperature range. Such a temperature range where the sorption rate of the sorbent is excellent is different according to the type of sorbent (see Esmail R. Monazam & Lawrence J. Shadle and Ranjani Siriwardane, Equilibrium and Absorption Kinetics of Carbon Dioxide by Solid Supported Amine Sorbent, Wiley Online Library, 2010).

Accordingly, the conventional method has a problem that the sorption rate of $CO_2$ by the recovery reactor has a certain limit and if the temperature of exhaust gas in the recovery reactor is out of the temperature range the sorbent cannot perform its function satisfactorily.

SUMMARY OF THE INVENTION

Accordingly, it is an object of the present invention to provide a dry $CO_2$ capturing device using multi sorbents so as to maintain the sorption rate for exhaust gas containing $CO_2$ in which temperature rises by reacting with the sorbent containing $CO_2$ absorbed therein.

In order to accomplish the above object, there is provided a dry carbon dioxide ($CO_2$) capturing device which includes at least two (a first and second) dry carbon dioxide ($CO_2$) capturing parts comprising: a first and second recovery reactors to recover $CO_2$ by contacting a solid sorbent with exhaust gas, which is fed from outside through an exhaust gas supply line and contains $CO_2$; a first and second recovery cyclones connected to the recovery reactors to discharge a gas while separating the solid sorbent capturing $CO_2$ ('$CO_2$-captured solid sorbent') only; a first and second regenerators connected to the recovery cyclones to receive the $CO_2$-captured solid sorbent and separate $CO_2$ captured in the solid sorbent through a fluidized gas; and a first and second pre-treatment reactors connected to the regenerators through sorbent supply lines to cool the solid sorbent free from $CO_2$ and feedback the cooled solid sorbent to the recovery reactors, wherein the first and second dry carbon dioxide ($CO_2$) capturing parts are connected to each other so as to feed an isolated gas, which is separated with the solid sorbent in the first recovery cyclone of the first dry $CO_2$ capturing part, to the second dry $CO_2$ capturing part through the exhaust gas supply line, and different solid sorbents are used in the first and second $CO_2$ capturing parts.

Preferably, the solid sorbent used in the first dry $CO_2$ capturing part has a lower sorption temperature range for absorbing $CO_2$ than the solid sorbent used in the second dry $CO_2$ capturing part.

Preferably, heat exchange between the first pre-treatment reactor and the second pre-treatment reactor is conducted by a pre-treatment heat exchanger, and heat exchange between the first regenerator and the second regenerator is conducted by a regeneration heat exchanger.

In accordance with one embodiment of the present invention, there is provided a dry carbon dioxide ($CO_2$) capturing device which includes at least two (a first and second) dry carbon dioxide ($CO_2$) capturing parts comprising: a first and second recovery reactors to recover $CO_2$ by contacting a solid sorbent with exhaust gas, which is fed from outside through an exhaust gas supply line and contains $CO_2$; a first and second recovery cyclones connected to the recovery reactors to discharge a gas while separating the solid sorbent capturing $CO_2$ ('$CO_2$-captured solid sorbent') only; a first and second regenerators connected to the recovery cyclones to receive the $CO_2$-captured solid sorbent and separate $CO_2$ captured in the solid sorbent through a fluidized gas; and a first and second pre-treatment reactors connected to the regenerators through sorbent supply lines to cool the solid sorbent free from $CO_2$ and feedback the cooled solid sorbent to the recovery reactors, wherein the first and second dry carbon dioxide ($CO_2$) capturing parts are connected to each other so as to feed an isolated gas, which is separated with the solid sorbent in the first recovery cyclone of the first dry $CO_2$ capturing part, to the second dry $CO_2$ capturing part through the exhaust gas supply line, different solid sorbents are used in the first and second $CO_2$ capturing parts, the second pre-treatment reactor of the second dry $CO_2$ capturing part is connected to the first pre-treatment reactor of the first dry $CO_2$ capturing part through a discharge line so as to feed a part of solid sorbent discharged from the second pre-treatment reactor to the first pre-treatment reactor, and a solid particle conveying part is provided between the first dry $CO_2$ capturing part and the second dry $CO_2$ capturing part so as to feed a part of solid sorbent discharged from the first pre-treatment reactor of the first dry $CO_2$ capturing part to the second pre-treatment reactor of the second dry $CO_2$ capturing part.

Preferably, the solid particle conveying part comprises a solid particle conveying pipe, the lower end of which is connected to the first pre-treatment reactor of the first dry $CO_2$ capturing part and which transfers the solid sorbent by conveying gas; and a conveying cyclone, one side of which is connected to the top end of the solid particle conveying pipe to remove the conveying gas and the other side of which is connected to the second pre-treatment reactor of the second dry $CO_2$ capturing part to transfer the solid sorbent.

According to the present invention, it is possible to increase the $CO_2$ sorption rate by a great deal compared with the conventional art.

It is also possible to save energy through heat exchange by using the temperature difference between the front dry $CO_2$ capturing part and the rear dry $CO_2$ capturing part.

And in the case of the method of mixing different sorbents, it is possible to expect an energy saving effect through heat transfer between solid sorbents.

BRIEF DESCRIPTION OF THE DRAWINGS

The above and other objects, features and other advantages of the present invention will be more clearly understood from the following detailed description taken in conjunction with the accompanying drawing, in which.

DETAILED DESCRIPTION OF THE INVENTION

Figure 1:
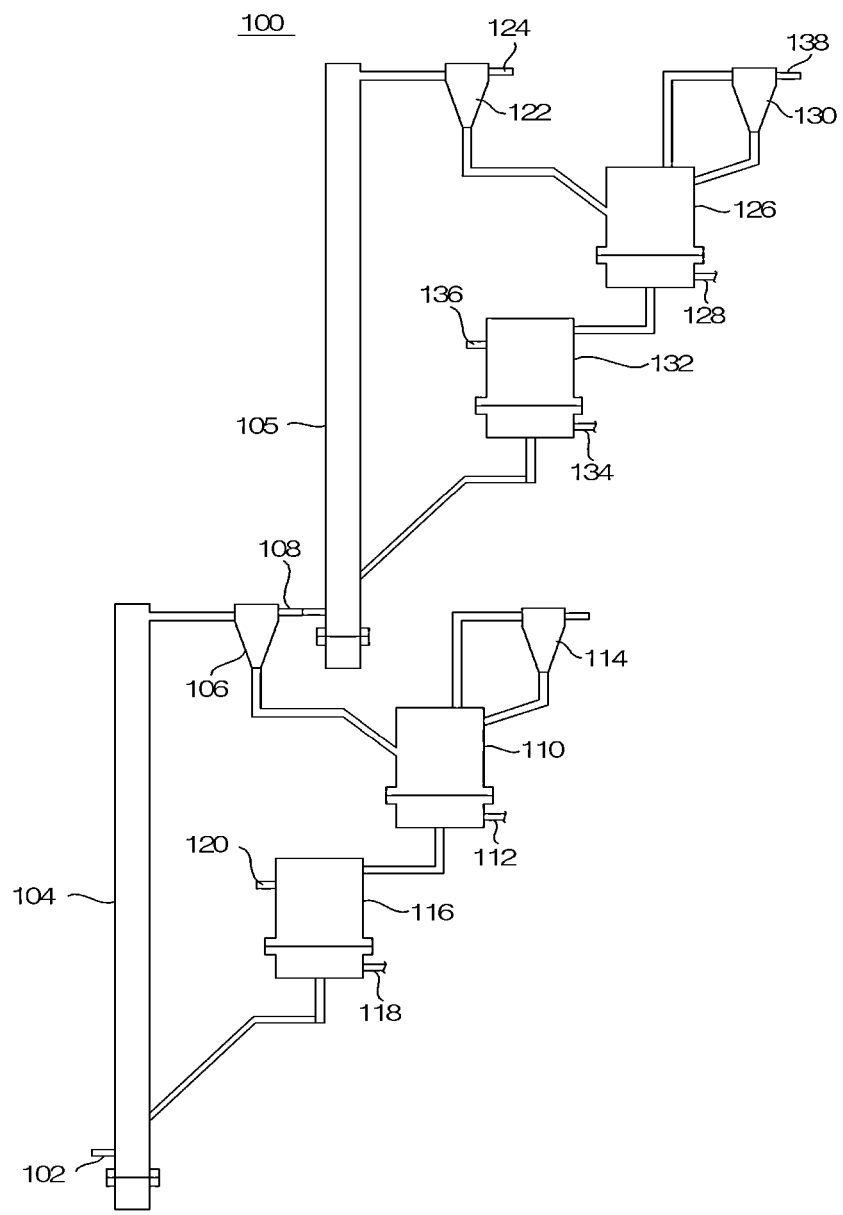
FIG. 1 is a schematic view showing a dry $CO_2$ capturing device using multi sorbents according to a first embodiment of the present invention.

The present invention will now be described more fully hereinafter with reference to the accompanying drawings forming a part of this specification wherein like reference characters designate corresponding parts in the several views. In the embodiments of the present invention, detailed description of the publicly known functions and configurations that are judged to be able to make the purport of the present invention unnecessarily obscure are omitted.

FIG. 1 shows a dry $CO_2$ capturing device 100 using multi sorbents according to a first embodiment of the present invention. The dry $CO_2$ capturing device 100 is characterized in that it uses two types of solid sorbents without the solid sorbents being mixed with each other.

The dry $CO_2$ capturing device 100 includes two (a first and second) dry $CO_2$ capturing parts, and there is no limit to the number of the dry $CO_2$ capturing parts. It is preferable that the two dry $CO_2$ capturing parts have an identical configuration. According to the major characteristics of the present invention, $CO_2$ in exhaust gas is absorbed first in a first dry $CO_2$ capturing part at the front side and then the exhaust gas is fed to a second dry $CO_2$ capturing part at the rear side to be absorbed for the second time. In the description of the present invention, the front side and the rear side are designated by the flow order of the exhaust gas and appeared at a lower portion and an upper portion in the drawings, respectively. The dry $CO_2$ capturing part generally includes a first and second recovery reactors 104 and 105, a first and second recovery cyclones 106 and 122, a first and second regenerators 110 and 126 and a first and second pre-treatment reactors 116 and 132, which are commonly known in the art.

The recovery reactors 104 and 105 may be a fixed bed reactor, a fluidized bed reactor or a recovery reactor typically used in other commonly known dry $CO_2$ capturing devices. Specifically, in the case of using the fluidized bed reactor, a dry solid sorbent is fluidized by exhaust gas fed from outside through an exhaust gas supply line 102, therefore, the exhaust gas in a gas state may actively contact a solid adsorbent in a solid state to improve $CO_2$ removal efficacy, thereby being preferable.

The dry solid sorbent used in the present invention may include any one generally used in the art, and in particular, $K_2CO_2$ or $Na_2CO_3$ having favorable $CO_2$ adsorption is preferably used. As known in the art, Na series particles have an sorption temperature range of 30 to 50° C. and a regeneration temperature range of 110 to 130° C. And likewise as known in the art, K series particles have an sorption temperature range of 60 to 80° C. and a regeneration temperature range of 140 to 160° C. Accordingly, in the present invention, $K_2CO_2$ or $Na_2CO_3$ may be used as solid sorbents. In the first embodiment, $Na_2CO_3$ may be used in the dry $CO_2$ capturing part at the front side and $K_2CO_2$ may be used in the dry $CO_2$ capturing part at the rear side.

The recovery cyclones 106 and 122 may be an apparatus commonly known in the art, wherein the solid sorbent containing $CO_2$ absorbed therein ('$CO_2$-absorbed solid sorbent') in the recovery reactor 104 and 105 is centrifuged to cause the solid sorbent to fall down by self-weight while light gas, that is, the exhaust gas free from $CO_2$ may flow through an isolated gas discharge line 112 connected to the recovery cyclones 106 and 122 to further operations.

The regenerators 110 and 126 may heat the $CO_2$-absorbed solid sorbent to allow the solid sorbent to release $CO_2$. Herein, a heating temperature of the solid sorbent may be higher than the injection temperature of the exhaust gas. Heating the solid sorbent in the regenerators 110 and 126 may be done in a fluidized state by the regenerated gas inflowing from regenerated gas supply lines 112 and 128 wherein the regenerated gas may be steam. When using steam as the regenerated gas, removing moisture only from the regenerated gas may preferably provide pure $CO_2$. Further, a diffusion plate to diffuse steam to hence perform fluidization of the solid sorbent is mounted inside the regenerators 110 and 126, and the solid sorbent is placed above the diffusion plate while the regenerated gas supply lines 112 and 128 may be connected to a bottom of the diffusion plate. The diffusion plate may be provided with a solid sorbent delivery line, which passes through the diffusion plate to transport the solid sorbent to the pre-treatment reactors 116 and 132, which are connected to the regenerators through sorbent supply lines.

The regenerators 110 and 126 may further be provided with regeneration cyclones 114 and 130 to prevent loss of the solid sorbent suspended by the regenerated gas. The regeneration cyclones 114 and 130 may substantially have the same structure as that of the recovery cyclones 106 and 122. The top end portion of the regenerators 110 and 126 is connected to a $CO_2$ discharge line 138 to discharge a gas absorbed to the solid sorbent, i.e., $CO_2$ therethrough.

The solid sorbent passed through the regenerators 110 and 126 may have a temperature, at which $CO_2$ is easily absorbed in the pre-treatment reactors 116 and 132, and then, may move to the recovery reactors 104 and 105.

In order to cool the solid sorbent in the pre-treatment reactors 116 and 132, a pre-treatment gas may be supplied to the pre-treatment reactors 116 and 132. Such a pre-treatment gas may include, for example, air or inert gas such as nitrogen and be supplied through pre-treatment gas supply lines 118 and 134. A temperature of the pre-treatment gas should be at least equal to or less than the injection temperature of the exhaust gas fed to the recovery reactors 104 and 105. In addition, the pre-treatment gas may rapidly cool the solid sorbent by fluidized bed motion of the solid sorbent in the pre-treatment reactors 116 and 132.

In addition, the dry solid sorbent containing $H_2O$ absorbed therein has a characteristic wherein $CO_2$ is easily soluble in $H_2O$, and may hence increase $CO_2$ sorption rate. Accordingly, it is preferable to supply the pre-treatment gas in a saturated water vapor state so as to early moisturize the solid sorbent.

The pre-treatment reactors 116 and 132 may be connected to the pre-treatment gas discharge lines 120 and 136 to discharge the pre-treatment gas fed to the pre-treatment reactors 116 and 132. In order to prevent the solid sorbent, which passes through the pre-treatment gas discharge lines 120 and 136, from releasing therefrom, a pre-treatment cyclone (not shown) with the same construction as that of the regeneration cyclones 114 and 130 may be mounted on the pre-treatment gas discharge lines 120 and 136. Accordingly, the solid sorbent recovered by the pre-treatment cyclone is fed back again to the pre-treatment reactors 116 and 132, while the pre-treatment gas with absorbed thermal energy only may be exhausted from the solid sorbent.

The solid sorbent discharged from the pre-treatment reactors 116 and 132 by contacting the pre-treatment gas with the solid sorbent has a temperature substantially identical to the injection temperature of the recovery reactors 104 and 105.

The dry $CO_2$ capturing parts are configured basically as described above. The first and second dry carbon dioxide ($CO_2$) capturing parts are connected to each other so as to feed an isolated gas, which is separated with the solid sorbent in the first recovery cyclone 106 of the first dry $CO_2$ capturing part, to the second dry $CO_2$ capturing part through the exhaust gas supply line.

Different solid sorbents are used in two or more $CO_2$ capturing parts. In particular, the solid sorbent used in the first dry $CO_2$ capturing part should have the sorption temperature range for absorbing $CO_2$ lower than the solid sorbent used in the second dry $CO_2$ capturing part. For this as mentioned above, in the first embodiment of the present invention, $Na_2CO_3$ is used in the first dry $CO_2$ capturing part, and $K_2CO_2$ is used in the second dry $CO_2$ capturing part. However, the present invention is not limited thereto.

According as exhaust gas is moved sequentially the temperature rises, and it comes to meet the solid sorbent having an sorption temperature range suited to the temperature of exhaust gas, so that $CO_2$ in the exhaust gas can be reliably absorbed into the solid sorbent.

Figure 2:
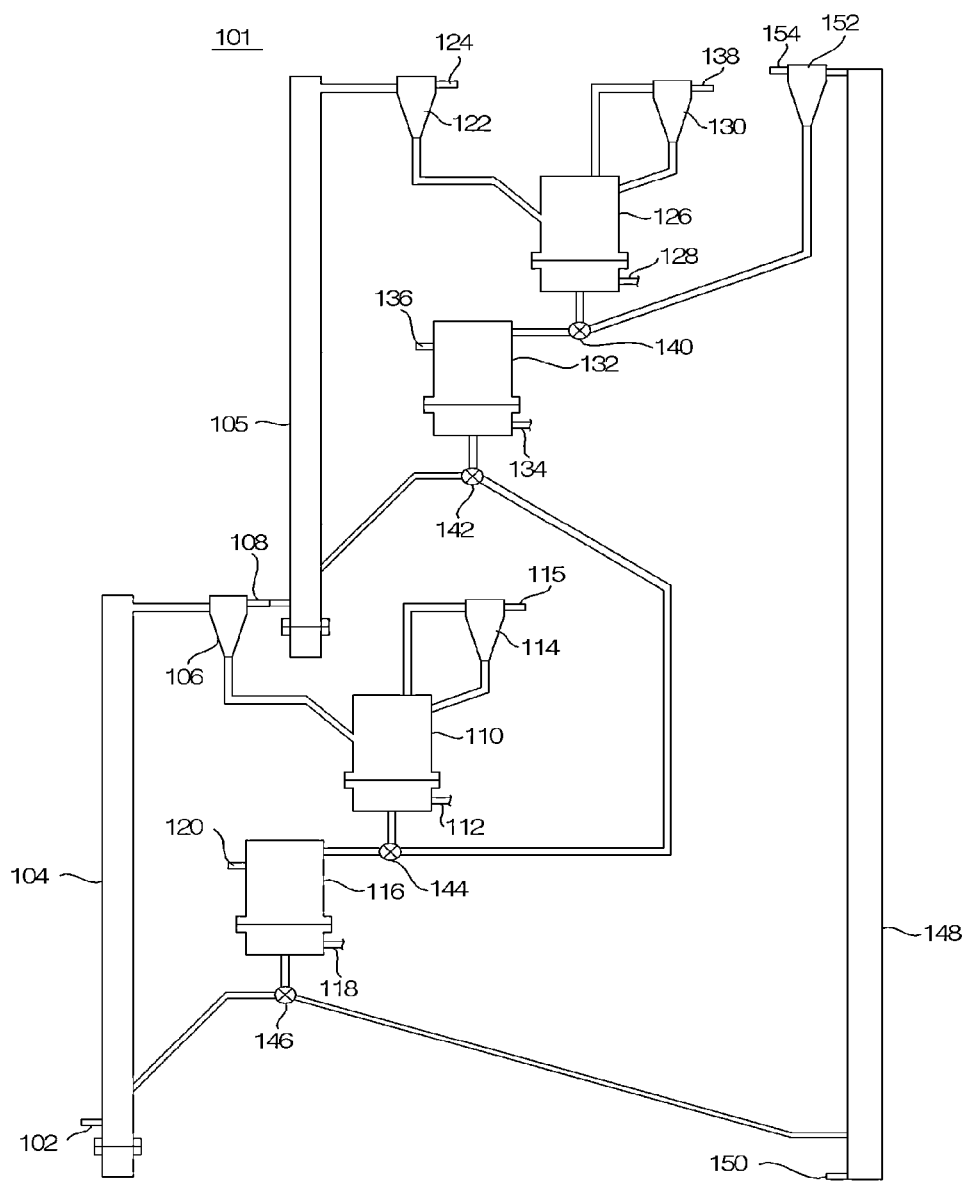
FIG. 2 is a schematic view showing a dry $CO_2$ capturing device using multi sorbents according to a second embodiment of the present invention.
Figure 3:
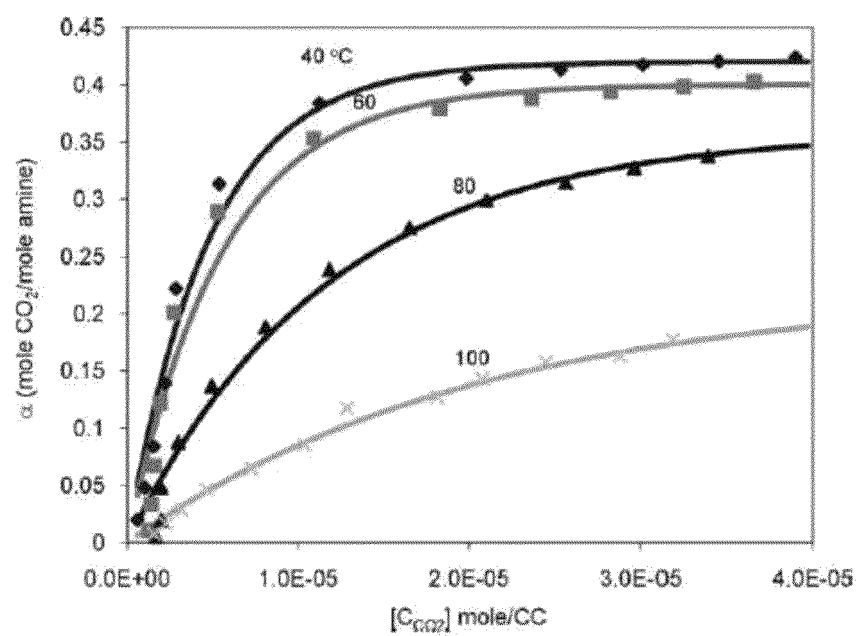
FIG. 3 is a graph showing the sorption ability of sorbents according to the sorption temperature.

Next, another dry $CO_2$ capturing device 101 according to the second embodiment of the present invention shown in FIG. 2 will be described. In the first embodiment and the second embodiment, identical drawing symbols are attached to the same components, and a description of them will be omitted. The dry $CO_2$ capturing device 101 uses different types of solid sorbents that are mixed with each other, unlike the dry $CO_2$ capturing device 100 of the first embodiment. In the first embodiment, when temperature rises from the first recovery reactor 104 at the front side to the second recovery reactor 105 at the rear side, the recovery reactors 104 and 120 should be replaced or the quantity of exhaust gas to be processed should be adjusted. But in the second embodiment, different types of solid sorbents are mixed to be used so that $CO_2$ can be absorbed from exhaust gas whose temperature has risen in the recovery reactor at the front side. At this time, in the reactors 104 and 120, the quantity (weight %) of the main solid sorbent that reacts mainly ($Na_2CO_3$ for the first dry $CO_2$ capturing part and $K_2CO_3$ for the second dry $CO_2$ capturing part in this embodiment) is adjusted to be greater than the quantity of the sub solid sorbent that is mixed with this.

To perform such an operation, a part of solid sorbent discharged from the pre-treatment reactor 132 of the second dry $CO_2$ capturing part is fed to the pre-treatment reactor 116 of the first dry $CO_2$ capturing part. For this purpose, a distributor 142 is installed in a discharge line of the second pre-treatment reactor 132, and the first output side of the distributor 142 is connected to the second recovery reactor 105, and the second output side is connected to the inflow line of the first pre-treatment reactor 116 at the front side. In some embodiment, the distributor 142 may be omitted.

In addition, a part of solid sorbent discharged from the first pre-treatment reactor 116 of the first dry $CO_2$ capturing part is fed to the first recovery reactor 104 by the distributor 146 installed in the discharge line of the first pre-treatment reactor 116, and the rest is fed to a solid particle conveying part. Namely, through the solid particle conveying part, part of the solid sorbent fed to the first dry $CO_2$ capturing part can be recovered to be transferred to the second pre-treatment reactor at the rear side.

The solid particle conveying part includes a solid particle conveying pipe 148, the lower end of which is connected to the pre-treatment reactor of the first dry $CO_2$ capturing part and which transfers solid sorbent by conveying gas; and a conveying cyclone 152, one side of which is connected to the top end of the solid particle conveying pipe 148 and the other side of which is connected to the pre-treatment reactor 132 of the second dry $CO_2$ capturing part. The conveying cyclone 152 removes the conveying gas fed from the solid particle conveying pipe 148 and feeds solid particles to the second pre-treatment reactor 132.

At this time, as conveying gas, air or inert gas may be used, and it is introduced from the first pre-treatment reactor through a conveying gas supply line 150 installed on the bottom of the solid particle conveying pipe 148. And the conveying gas is discharged through a conveying gas discharge line 154 as it passes through the conveying cyclone 152, and only solid sorbent is fed to the second pre-treatment reactor 132. On the inflow line side of the second pre-treatment reactor 132 is installed a distributor 140 to mix the solid sorbent introduced from the conveying cyclone 152 and the solid sorbent introduced from the second regenerator 126. The distributor 140 may be omitted.

If the solid sorbent that acts mainly at the rear side is fed to the front side through such a mixing of solid sorbents, it raises the temperature of solid sorbent that acts mainly at the front side. Accordingly, there is an advantage that it is possible to reduce heat energy necessary for heating solid sorbent to the reaction temperature required when putting solid sorbent into the first recovery reactor.

Since the pre-treatment reactors 116 and 132 and the regenerators 110 and 126 maintain temperature differences constant at all times, it is preferable that heat exchange between the first pre-treatment reactor 116 and the second pre-treatment reactor 132 is conducted by a pre-treatment heat exchanger, and heat exchange between the first reactor 110 at the front side and the second regenerator 126 at the rear side is conducted by a regeneration heat exchanger. Through this, the present invention has an effect of additionally saving heat energy. The ones in public domain may be used for the regeneration heat exchanger and the pre-treatment heat exchanger, and heat exchange is made through a heat refrigerant jacket and a heat medium loop duct. If necessary for circulation of a heat medium, a heat medium pump may be added to a heat medium loop duct.

Although preferred embodiments of the present invention have been described for illustrative purposes, those skilled in the art will appreciate that various alterations and modification are possible, without departing from the scope and spirit of the present invention as disclosed in the appended claims.

What is claimed is:

1. A dry carbon dioxide ($CO_2$) capturing device which includes at least two (a first and second) dry carbon dioxide ($CO_2$) capturing parts comprising:
a first and second recovery reactors to recover $CO_2$ by contacting a solid sorbent with exhaust gas, which is fed from outside through an exhaust gas supply line and contains $CO_2$;

a first and second recovery cyclones connected to the recovery reactors to discharge a gas while separating the solid sorbent capturing $CO_2$ ('$CO_2$-captured solid sorbent') only;

a first and second regenerators connected to the recovery cyclones to receive the $CO_2$-captured solid sorbent and separate $CO_2$ captured in the solid sorbent through a fluidized gas; and a first and second pre-treatment reactors connected to the regenerators through sorbent supply lines to cool the solid sorbent free from $CO_2$ and feedback the cooled solid sorbent to the recovery reactors, wherein the first and second dry carbon dioxide ($CO_2$) capturing parts are connected to each other so as to feed an isolated gas, which is separated with the solid sorbent in the first recovery cyclone of the first dry $CO_2$ capturing part, to the second dry $CO_2$ capturing part through the exhaust gas supply line, and different solid sorbents are used in the first and second $CO_2$ capturing parts.

2. The device according to claim 1, wherein the solid sorbent used in the first dry $CO_2$ capturing part has a lower sorption temperature range for absorbing $CO_2$ than the solid sorbent used in the second dry $CO_2$ capturing part.

3. The device according to claim 1, wherein heat exchange between the first pre-treatment reactor and the second pre-treatment reactor is conducted by a pre-treatment heat exchanger, and heat exchange between the first regenerator and the second regenerator is conducted by a regeneration heat exchanger.

4. A dry carbon dioxide ($CO_2$) capturing device which includes at least two (a first and second) dry carbon dioxide ($CO_2$) capturing parts comprising:

a first and second recovery reactors to recover $CO_2$ by contacting a solid sorbent with exhaust gas, which is fed from outside through an exhaust gas supply line and contains $CO_2$;

a first and second recovery cyclones connected to the recovery reactors to discharge a gas while separating the solid sorbent capturing $CO_2$ ('$CO_2$-captured solid sorbent') only;

a first and second regenerators connected to the recovery cyclones to receive the $CO_2$-captured solid sorbent and separate $CO_2$ captured in the solid sorbent through a fluidized gas; and a first and second pre-treatment reactors connected to the regenerators through sorbent supply lines to cool the solid sorbent free from $CO_2$ and feedback the cooled solid sorbent to the recovery reactors, wherein the first and second dry carbon dioxide ($CO_2$) capturing parts are connected to each other so as to feed an isolated gas, which is separated with the solid sorbent in the first recovery cyclone of the first dry $CO_2$ capturing part, to the second dry $CO_2$ capturing part through the exhaust gas supply line, different solid sorbents are used in the first and second $CO_2$ capturing parts, the second pre-treatment reactor of the second dry $CO_2$ capturing part is connected to the first pre-treatment reactor of the first dry $CO_2$ capturing part through a discharge line so as to feed a part of solid sorbent discharged from the second pre-treatment reactor to the first pre-treatment reactor, and a solid particle conveying part is provided between the first dry $CO_2$ capturing part and the second dry $CO_2$ capturing part so as to feed a part of solid sorbent discharged from the first pre-treatment reactor of the first dry $CO_2$ capturing part to the second pre-treatment reactor of the second dry $CO_2$ capturing part.

5. The device according to claim 4, wherein the solid particle conveying part comprises:

a solid particle conveying pipe, the lower end of which is connected to the first pre-treatment reactor of the first dry $CO_2$ capturing part and which transfers the solid sorbent by conveying gas; and a conveying cyclone, one side of which is connected to the top end of the solid particle conveying pipe to remove the conveying gas and the other side of which is connected to the second pre-treatment reactor of the second dry $CO_2$ capturing part to transfer the solid sorbent.

* * * * *